United States Patent [19]

Madill

[11] Patent Number: 4,926,713
[45] Date of Patent: May 22, 1990

[54] MULTIPLE GEAR-RATIO AUTOMATIC TRANSMISSION

[75] Inventor: E. Gaylord Madill, Edmonton, Canada

[73] Assignee: H.V.T. Technology Ltd., Edmonton, Canada

[21] Appl. No.: 323,979

[22] Filed: Mar. 15, 1989

[51] Int. Cl.⁵ .................. F16H 37/00; F16H 3/44; F16H 57/10
[52] U.S. Cl. .................................. 475/146; 475/280
[58] Field of Search ............ 74/740, 751, 753, 754, 74/793, 360, 770, 751, 753, 754, 793, 360

[56] References Cited

U.S. PATENT DOCUMENTS

| | | | |
|---|---|---|---|
| 2,523,619 | 9/1950 | Grebb | 74/688 |
| 3,031,901 | 5/1962 | Simpson | 74/770 |
| 3,209,620 | 9/1962 | Moan | 74/781 |
| 3,688,601 | 9/1972 | Dach | 74/753 |
| 3,733,928 | 5/1973 | Uozumi et al. | 74/753 |
| 3,893,352 | 7/1975 | Cotton | 74/768 |
| 3,956,946 | 5/1976 | Murakami et al. | 74/753 X |
| 4,015,486 | 4/1977 | Zach, Jr. | 74/770 X |
| 4,235,125 | 11/1980 | Perlin | 74/758 |
| 4,327,604 | 5/1982 | Evans | 74/751 |
| 4,334,440 | 6/1982 | Fonck | 74/789 |
| 4,446,758 | 5/1984 | Winzeler et al. | 74/766 X |
| 4,472,984 | 9/1984 | Cook | 74/677 |
| 4,579,019 | 4/1986 | Gabriele | 74/682 |
| 4,598,610 | 7/1986 | Kim | 74/682 |
| 4,607,541 | 8/1986 | Miura et al. | 74/674 |
| 4,625,588 | 12/1986 | Brickley | 74/793 |
| 4,638,688 | 1/1987 | Hiraiwa | 74/753 X |
| 4,738,162 | 4/1988 | Slotosch | 74/766 X |

FOREIGN PATENT DOCUMENTS

| | | |
|---|---|---|
| 757823 | 5/1967 | Canada . |
| 808912 | 3/1969 | Canada . |
| 931784 | 8/1973 | Canada . |
| 965265 | 4/1975 | Canada . |
| 1120750 | 3/1982 | Canada . |
| 1209375 | 8/1986 | Canada . |

Primary Examiner—Dwight G. Diehl
Assistant Examiner—Khoi Q. Ta
Attorney, Agent, or Firm—Sim & McBurney

[57] ABSTRACT

A novel power transmission mechanism is provided in which a wide variety of both forward and reverse speed ratios are achieved by coupling two or more planetary gearsets in a unique way. Power input is applied to one of the sun gear, ring gear and planet carrier of the first planetary gearset while another of the gears is maintained stationary and output is taken from one of the sun gear, ring gear and planet carrier not maintained stationary in the first gearset (except that, when power is transmitted to the ring gear, the planet carrier is not maintained stationary). The procedure then is repeated for the second and any subsequent planetary gearset which usually has an overall different gear ratio from the first planetary gearset. Each planetary gearset is capable of producing four forward output ratios and one reverse ratio. Because of the different ratios of the various gearsets, multiple ratios of output are attainable. Individual hydraulic clutches are used to effect clamping of elements to effect power transmittal and locking. Power transfer plates permit selective input to and output from the gear elements. A stationary central shaft allows the sun gears to be held locked when required. A reaction sleeve is employed as the means to input to the ring gear to hold the ring gear or planet carrier stationary as needed.

6 Claims, 4 Drawing Sheets

MULTIPLE GEAR-RATIO AUTOMATIC TRANSMISSION

FIELD OF INVENTION

The present invention relates to an automatic transmission, more particularly to an automatic transmission of the type having a large number and wide range of gear ratios.

BACKGROUND TO THE INVENTION

Automatic transmissions for the transmittal of power from a power source to a load are well known and some have employed planetary gearsets. However, such transmissions have been limited with respect to the range of gear ratios attainable thereby, resulting in less than optimum system economy and performance.

A search has been conducted in the U.S. Patent and Trademark Office with respect to the subject matter of this invention and the following U.S. Pat. Nos. relating to automatic power transmissions have been noted in that search as the closest prior art:

|           |           |
|-----------|-----------|
| 2,523,619 | 4,472,984 |
| 3,209,620 | 4,579,019 |
| 3,893,352 | 4,598,610 |
| 4,327,604 | 4,625,588 |
| 4,334,440 |           |

U.S. Pat. No. 2,523,619 discloses a conventional type of automatic transmission having a torque converter and planetary gear components, in which sliding mechanical clutches are employed rather than the more normal hydraulic disc clutches. The transmission has only a limited number of gear ratios.

U.S. Pat. No. 3,209,620 also discloses a conventional type of automatic transmission having planetary gear components, in which the torque converter is replaced by a magnetic particle clutch. Again, the transmission has only a limited number of gear ratios.

U.S. Pat. No. 3,893,352 discloses an automatic transmission design having a variable gear ratio design utilizing planetary gear sets and a hydraulic screw pump which controls the speed of rotation of a third member of the first planetary gearset.

U.S. Pat. No. 4,327,604 also discloses a variable ratio design of automatic transmission using planetary gearsets. In this case, one planetary gearset divides the input shaft torque and speed between two driven members of the planetary gearset.

U.S. Pat. No. 4,339,440 discloses a completely mechanical variable ratio power transmission design wherein members of three planetary gearsets are interconnected.

U.S. Pat. No. 4,472,984 discloses an automatic transmission which employs a compound planetary gearset and a torque converter. The transmission appears to possess but a single gear ratio with speed variation occurring through the torque converter.

U.S. Pat. No. 4,579,019 is similar to U.S. Pat. No. 4,327,604 in that the power input is divided and added to components in combination to achieve the desired output variation.

U.S. Pat. No. 4,598,610 is a somewhat complex variable ratio transmission using trains with gearsets linked up rather than single gearsets.

U.S. Pat. No. 4,625,588 also discloses a variable ratio transmission using planetary gearsets. Each of the planet gears of the first planetary group interact with the control sun and driven sun to permit the reaction forces in all the components to react or rotate simultaneously.

SUMMARY OF INVENTION

The present invention is broadly directed to a power transmission comprising a simple planetary gearset and selectively-operable disc clutches to achieve five of the theoretically-possible six gear ratios, which permits the joining together of two or more simple planetary gearsets having the same or preferably different ratios of diameters of ring and sun gears, so as to provide an automatic power transmission which has a large number of forward and reverse gear ratios.

In accordance with the present invention, there is provided a power transmission mechanism, comprising a planetary gearset having a sun gear, a ring gear and planet gears mounted in a planet carrier and intermeshing with both the sun gear and the ring gear thereof, power input means to the planetary gearset and power output means from the planetary gearset.

Means is provided for selectively transmitting power from the power input means to one of the sun gear, ring gear and planet carrier of the gearset while another of the sun gear, ring gear and planet carrier is maintained stationary, other than the planet carrier when power is transmitted to the ring gear. In this way, the remainder of the sun gear, ring gear and planet carrier of the gearset produce a power output to the power output means having one of four forward and one reverse speeds with respect to the power input means.

In the present invention, therefore, power is selectively transmitted from the power input to one of the sun gear, ring gear and planetary gear of the planetary gearset. Another of the gears is maintained stationary, the exception being that the planetary gear is not maintained stationary when power is transmitted to the ring gear. Depending on the choice of the gear to which power is transmitted and the gear which is maintained stationary, a power output from the planetary gearset is provided which has one of four forward speeds or one reverse speed with respect to the power input.

The planetary gearset usually is mounted with the sun gear rotatably mounted on a stationary shaft. The selective power transmission means usually comprises power transfer plate means rotatably mounted on the stationary shaft adjacent to and operatively connected to the power input means, selectively operable hydraulic clutch means connecting the power transfer plate means and the sun gear, ring gear and planet carrier of the planetary gearset, and selectively operable hydraulic clutch means for connecting the sun gear to the stationary shaft and the ring gear and planet carrier to a reaction sleeve.

In the power transmission of the invention, each of the gearset components, i.e. sun gear, ring gear and planet carrier, functions in three modes, namely driven, stationary and driving. To provide drive to the gearset components, an input drive plate is attached to the power plant flywheel, either directly or indirectly through gears. Two clutches may be provided on the input drive plate connected to the sun gear and the planet carrier while a reaction sleeve may be used to transfer torque from the input plate to the ring gear. Power output from the planetary gearset may be achieved by clutches which connect the gearset components to an output drive plate.

The sun gear is held stationary by rotatably mounting it on a central shaft fixed permanently to the transmission casing and locking it to the shaft by a hydraulic clutch when required. The ring gear and planet carrier can be held stationary through connections to the reaction sleeve and a hydraulic clutch fixed in the case connected to the reaction sleeve.

By adding a second, third or more simple, planetary gearsets, multiplications of the ratios can be achieved. The use of just two simple, planetary gearsets enables the provision of twenty-five forward and ten reverse gear ratios while the addition of a further planetary gearset to those two potentially extends the number of ratios to more than 100 forward and 40 reverse.

The power transmission mechanism of the present invention does not require the use of a torque converter but rather employs a large number of individual hydraulic disc packs, drive plates, reaction sleeves to transmit driving or braking selectively, a central reactionary shaft and rotating clutches served by pumps mounted in the members to which the clutches are attached.

In one preferred embodiment of the present invention, there is provided a power transmission mechanism, comprising a stationary shaft; a first planetary gearset having a sun gear, a ring gear and planet gears mounted in a planet carrier and intermeshing with both the sun gear and the ring gear with the sun gear rotatably mounted on the stationary shaft; a second planetary gearset having a sun gear, a ring gear and planet gears mounted in a planet carrier and intermeshing with both the sun gear and the ring gear with the sun gear being rotatably mounted on the stationary shaft longitudinally spaced from the first planetary gearset; power input means and power output means.

Means is provided for selectively transmitting power from the power input means to one of the sun gear, ring gear and planet carrier of the first planetary gearset while another of the sun gear, ring gear and planet carrier of the planetary gearset is maintained stationary, other than the planet carrier when power is transmitted to the ring gear, whereby the remainder of the sun gear, ring gear and planet carrier of the first planetary gearset produces a first planetary gearset power output having one of four forward and one reverse speeds with respect to the power input.

Means is provided for selectively transmitting power from the first planetary gearset power output to one of the sun gear, ring gear and planet carrier of the second planetary gearset while another of the sun gear, ring gear and planet carrier of the second planetary gearset, other than the planet carrier when power is transmitted to the ring gear, whereby the remainder of the sun gear, ring gear and planet carrier of the second planetary gearset produce a second planetary gearset power output having one of four forward and one reverse speeds with respect to the first planetary gearset power output.

Means operatively connects the second planetary gearset power output to the power output means of the transmission.

In this embodiment the power output from the first planetary gearset provides, via a central power transfer plate, power input to the second planetary gearset in the same way as power is applied from the power input to the first gearset. Depending on the choice of sun gear, ring gear or planetary gear to which the power input is applied and the gear maintained stationary, again an output is provided from the second planetary gearset which is one of four forward speeds or one reverse speed with respect to the power input from the first gearset. Since the power input to the second planetary gearset is of variable speed with respect to the power input to the transmission, the overall power output from the second planetary gearset may be one of twenty-five different forward speeds or one of ten different reverse speeds with respect to the power input to the transmission, where different ratios of diameter of ring gear and sun gear are utilized in the two planetary gearsets.

The hydraulic pressure for actuation of the hydraulic clutches employed in the present invention to effect power transmission, may be provided by a single pump. However, it is preferred to provide individual hydraulic pumps mounted on the drive plates and reaction sleeves, so as to provide direct connection between the pumps and associated clutches and avoid problems of sealing oil passages between moving and fixed sections. Alternatively, a single pump may be provided for multiples of hydraulic clutches on a single plate.

The ability to produce a wide range of output speed ratios, in both forward and reverse direction, permits the powerplant, typically an internal combustion engine in a motor vehicle, to perform in its most efficient range for any particular operating condition, thereby improving fuel efficiency. The overall lower engine speeds attainable, mainly from overdrive ratios, also contribute to less engine wear and less engine noise. Further, with the multiple reduction ratios available, an engine is able to develop its maximum rpm when required, thereby permitting a smaller engine to match the performance of a larger engine attached to a conventional transmission.

The multiple ratios attainable with the relatively simple structure of the invention enables a lightweight versatile transmission to be provided which permits the engine to be downsized and an overall saving of powertrain size and weight to be achieved.

DESCRIPTION OF PREFERRED EMBODIMENT

Figure 1:
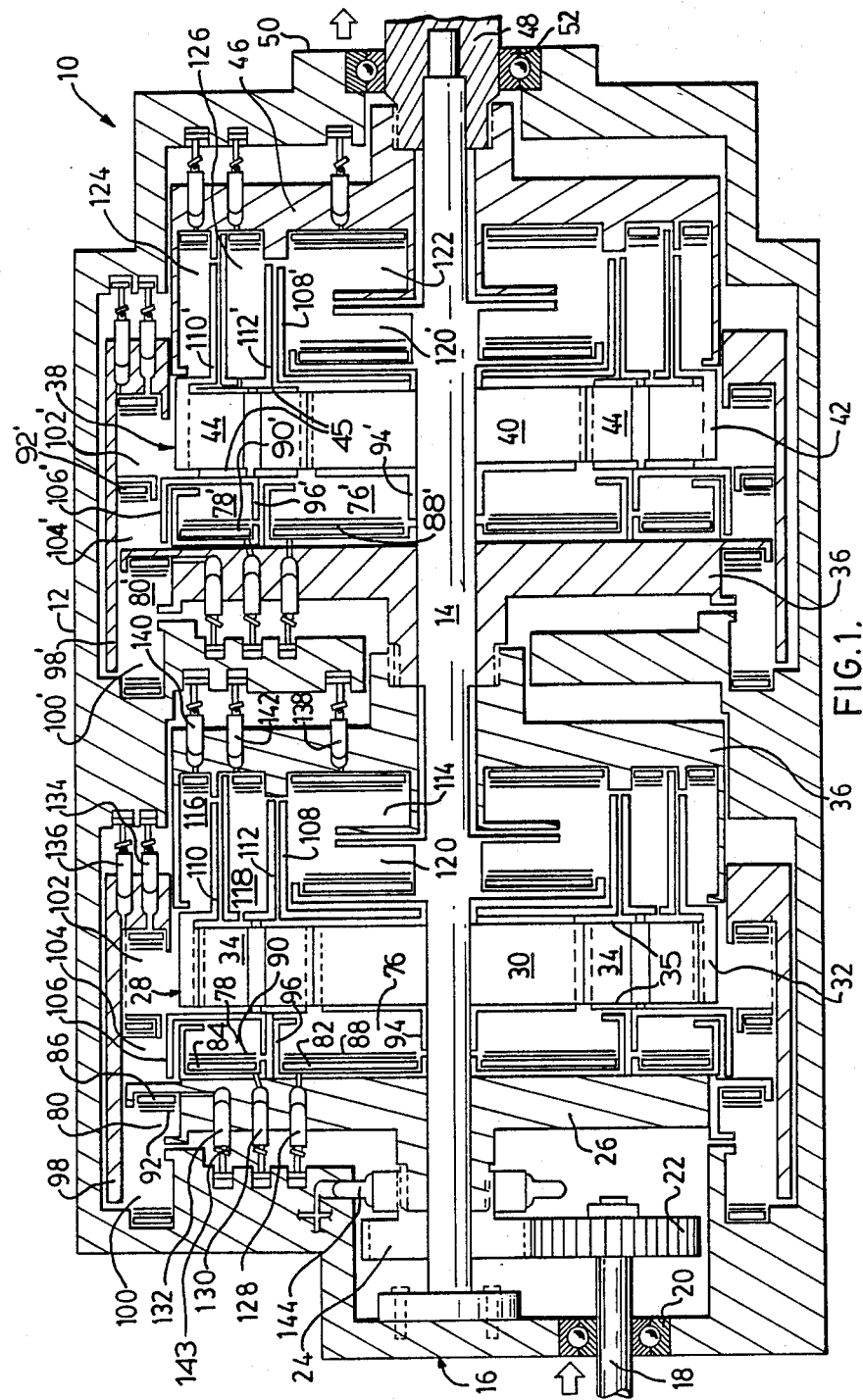
FIG. 1 is a longitudinal sectional view of a variable ratio automatic transmission provided in accordance with one embodiment of the invention.

Referring to the drawings, a highly variable ratio automatic transmission 10 includes an outer housing 12 and a central axially-extending stationary shaft 14 mounted to the housing 12 at one end 16 thereof. A power input shaft 18 is journalled to the end housing 16 by bearing 20 and terminates in a gear 22 which meshes with a gear 24 rotatably mounted on the stationary shaft 14.

A first power transfer plate 26 also is rotatably mounted on the shaft 14 for transfer of power from the power input 18 to a first planetary gearset 28, which includes a sun gear 30 rotatably mounted on the shaft 14, a ring gear 32 and planetary gears 34 intermeshing with the sun gear 30 and the ring gear 32. A second power transfer plate 36 is rotatably mounted on the shaft 14 for the transfer of power output from the first planetary gearset 28 to a second planetary gearset 38, which includes a sun gear 40 rotatably mounted on the shaft 14, a ring gear 42 and planetary gear 44 intermeshing with the sun gear 40 and the ring gear 42.

An output transfer plate 46 is rotatably mounted on the shaft 14 and transfers power output from the second planetary gearset 38 to a power output shaft 48 which is journalled to the end 50 of housing 12 opposite to end 16 by bearings 52 and is rotatably mounted on the stationary shaft 14.

Power transmission from the input shaft 18 to the output shaft 48 is through the transfer plate 26, first planetary gearset 28, transfer plate 36, second planetary gearset 38 and transfer plate 46, the specific path of transmission and the ratio of speed and direction of rotation of the input shaft 18 relative to the output shaft 48 being dependent on the elements which are clamped together in torque-transmitting relationship and in reaction relationship at any given time, as discussed in more detail below. Clamping is achieved using individual hydraulically activated clutches, as described below.

Figure 2:
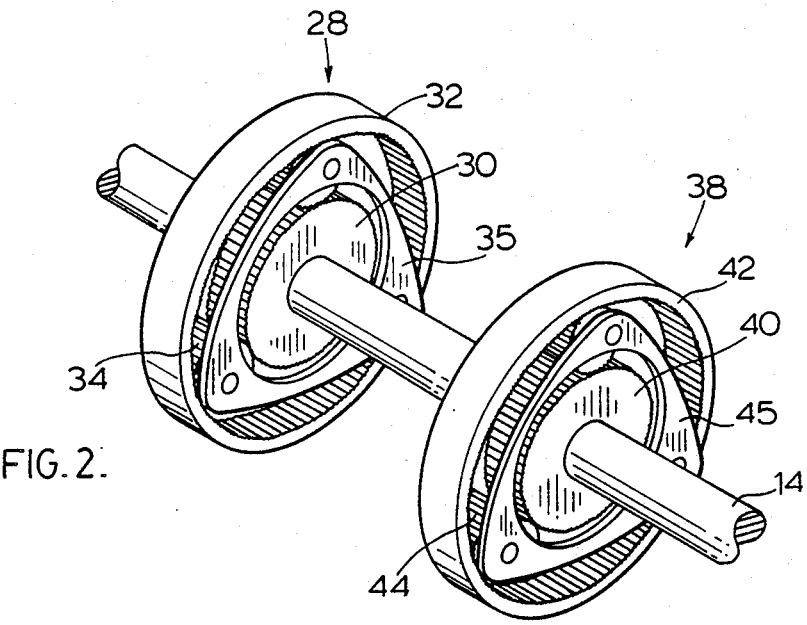
FIG. 2 is schematic perspective view of a pair of planetary gears mounted on a stationary shaft as employed in the transmission of FIG. 1.

The two simple planetary gearsets 28 and 38 are of conventional construction and are shown schematically in FIG. 2 mounted on stationary shaft 14. In this schematic illustration, three planet gears 34 are shown and these are usually maintained equi-circumferentially-distant apart by a planetary carrier 35. A larger number of planetary gears may be used, rotatably mounted in a suitable planetary carrier.

Power may be transmitted from the power input shaft 18 to any one of the sun gear 30, ring gear 32 or planet carrier 35 in the manner described below. To achieve a power output from the planetary gearset 28, one of the non-power receiving gears is held stationary and then the power output is at the other of the non-power receiving gears. This arrangement produces six possible gear ratios, as set forth in the following Table I:

TABLE I (S = sun gear, R = ring gear, P = planet carrier)

| Ratio # | Power Input | Locked | Power Output | Speed[1] | Effect Rotation[2] | Torque[1] |
|---|---|---|---|---|---|---|
| 1 | P | S | R | + | F | − |
| 2 | P | R | S | + | F | − |
| 3 | R | P | S | + | R | − |
| 4 | R | S | P | − | F | + |
| 5 | S | R | P | − | F | + |
| 6 | S | P | R | − | R | + |

Note:
[1] + = increase, − = decrease
[2] F = forward, R = reverse

As may be seen from Table I, of the six ratios possible, four are forward and two are reverse. In the present invention, five only of these ratios are employed, since the ratio #3 cannot be achieved using the arrangement of hydraulic clutches, stationary shaft and reaction sleeve employed. A transmission design which uses essentially the elements and structure of this transmission but which obtains ratio #3 at the expense of one of the other ratios is a variation of this design and is included herein. These same five ratios are achieved by both planetary gearsets 28 and 38, so that application of the power output from the first planetary gearset 28 to the second planetary gearset 38 produces a power output from the second planetary gearset 38 which can have a widely varying ratio.

The actual ratio achieved in a gearset depends on the gear ratio between the sun and ring gears, i.e. the ratio of the diameters of the ring (R) and sun (S) gears. The following Table II provides an illustration of the output ratios achieved from a single planetary gearset for variations in the gear ratio of sun gear and ring gear:

TABLE II

| Formula | Ratio # | Ratio R/S | | | | | |
|---|---|---|---|---|---|---|---|
| | | 5:1 | 4.5:1 | 4:1 | 3:1 | 2.5:1 | 2:1 |
| R/(S + R) | 1 | 0.83 | 0.82 | 0.8 | 0.75 | 0.7 | 0.67 |
| S/(S + R) | 2 | 0.17 | 0.18 | 0.2 | 0.25 | 0.3 | 0.33 |
| (S + R)/R | 4 | 1.2 | 1.22 | 1.25 | 1.33 | 1.4 | 1.67 |
| (S + R)/S | 5 | 6.0 | 5.5 | 5.0 | 4.0 | 3.5 | 3.0 |
| R/S (REV) | 6 | 5.0 | 4.5 | 4.0 | 3.0 | 2.5 | 2.0 |

It is apparent from this Table II that, since varying output ratios are achievable with differing ratios of diameters of ring gear and sun gear and, for any given ratio of diameters of ring gear and sun gear, four forward and one reverse output ratios can be achieved, that for two simple planetary gearsets having different ratios of diameters of ring gear and sun gear, compounded together may achieve a considerable number and range of gear ratios.

Figure 3:
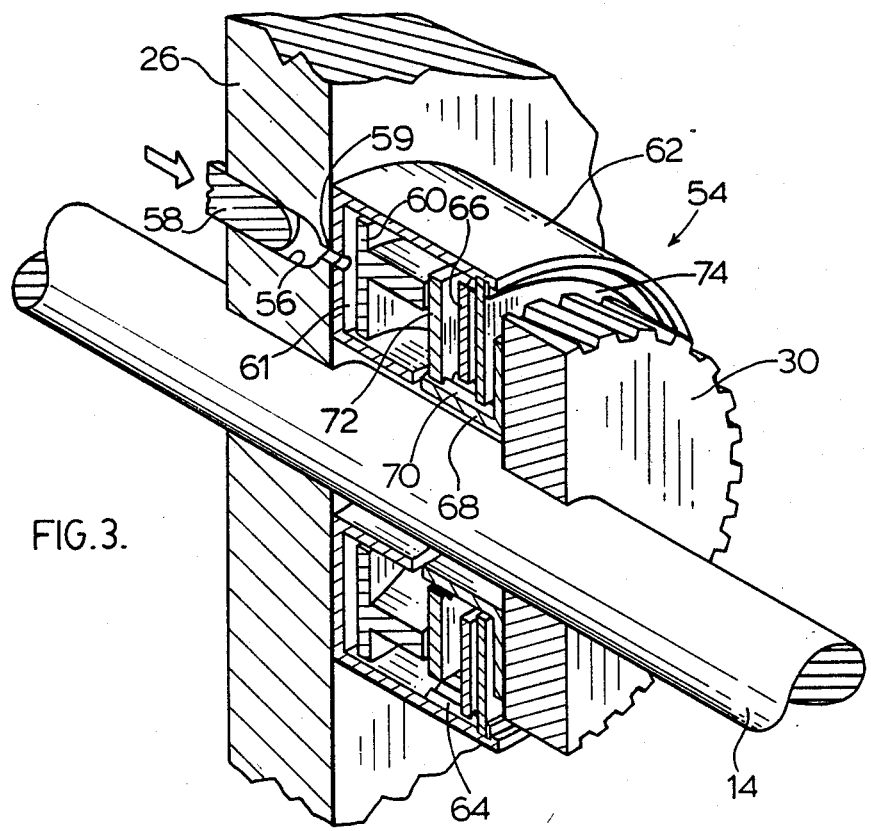
FIG. 3 is perspective cut-away close-up view of a hydraulic clutch arrangement used to transmit power between elements in the transmission of FIG. 1.
Figure 4:
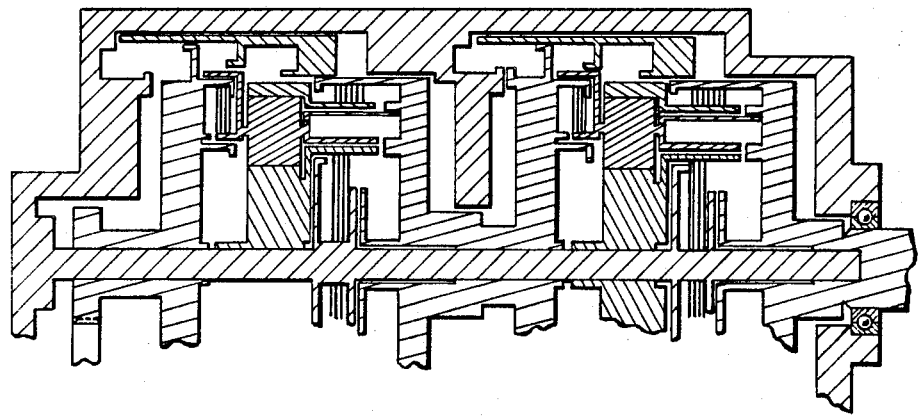
FIGS. 4 to 8 show the engagement of clutches necessary to produce specific speed ratios as described below.
Figure 5:
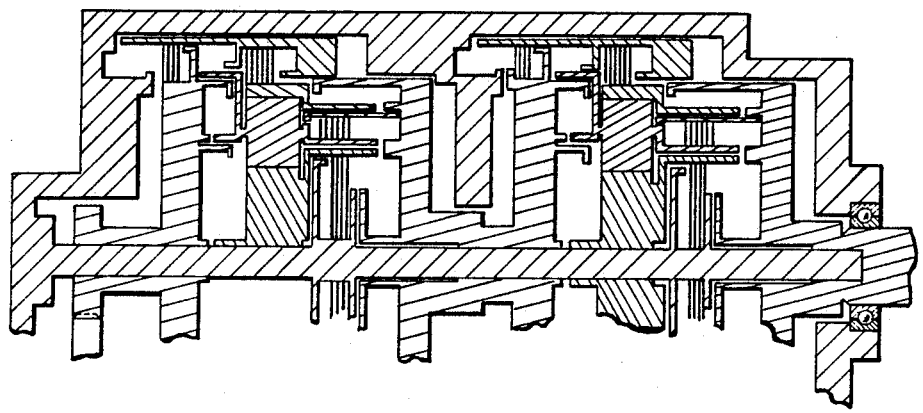
Figure 6:
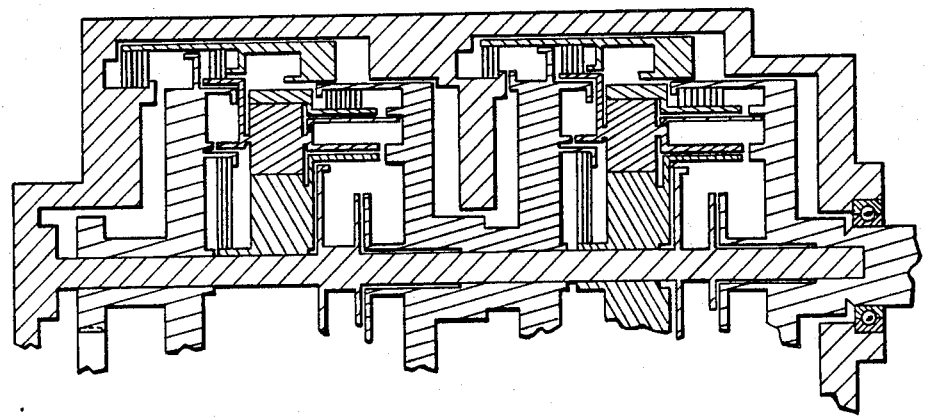
Figure 7:
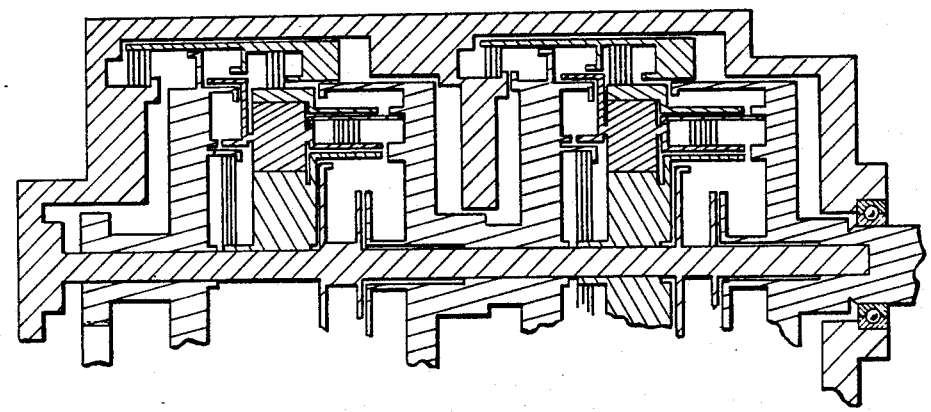
Figure 8:
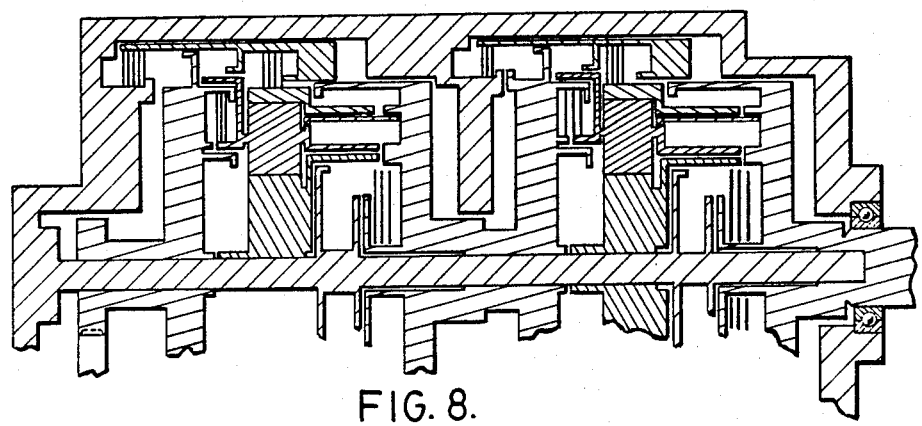

The transmission of torque is achieved using individual hydraulic clutches 54 (FIG. 3), which are all constructed identically, except as otherwise described, and being of conventional construction. The hydraulic clutches 54, when activated, clamp together individual gear elements to the power distribution plates so as to transmit torque to and from the individual gear elements. FIG. 3 shows a typical arrangement of hydraulic clutch used herein, in this instance for transmitting power from the power input distribution plate 26 to the sun gear 30 of the first planetary gearset 28.

As seen therein, the plate 26 has a chamber 56 which receives a reciprocable piston 58 of a hydraulic pump to apply pressure through a passage 59 to the rear of a clutch piston plate 60 mounted in a cylinder 61. A cylindrical sleeve or hub 62 mounted to the face of the plate 26 has a smooth section to form cylinder 61 and extending from it a grooved or splined internal surface 64 to mesh with the toothed outer periphery of a plurality of circular longitudinally-slidable clutch plates 66. A cylindrical sleeve or hub 68 mounted to the face of the sun gear 30 extends towards plate 26 and has grooves or splines 70 which mesh with the toothed inner periphery of a plurality of circular longitudinally-slidable clutch plates 72 interleaved with the clutch plates 66. The clutch plates 66 and 72 are arranged substantially to fill the space between the clutch piston plate 60 and pressure plate 74 on hub 62.

When the piston 58 is not activated, the plate 26 and sun gear 30 are able to rotate relative to each other with their respective splined clutch plates 66, 72 and no power is transmitted between the two. However, when the piston 58 is activated, the hydraulic pressure pushes the clutch piston plate 60 against the array of plates 66 and 72, thereby forcing them into face-to-face engagement against the pressure plate 74, whereby the frictional engagement of the plates 66 and 72 causes power to be transmitted from the plate 26 to the sun gear 30 and thereby the plate 26 and the sun gear 30 to rotate in unison.

Referring back to FIG. 1, three clutch cylinders 76, 78 and 80 with respective pistons 82, 84 and 86 and clutch elements 88, 90 and 92 are attached to the plate 26. The clutch elements 88, 90 mesh respectively with hubs 94, 96 from the adjacent sun gear 30 and planet carrier 35. The clutch elements 92 extend radially to mesh with a torque or reaction sleeve 98, which extends from and circumferentially surrounds the outward end of the input clutch to the ring gear 32 of the planetary gearset 28. At the outboard end of the reaction sleeve 98 is a clutch 100 keyed into the casing 12 and at the other end is a clutch 102 splined with the ring gear 32 of the first planetary gearset 28. Located between the clutch 100 and clutch 102 is a clutch 104 which is meshed with a second hub 106 extending from the planet carrier 35 of the first planetary gearset.

On the opposite side of the first planetary gearset 28 are three hubs 108, 110, 112 respectively extending from the sun gear 30, ring gear 32 and planet carrier 35. These hubs mesh with clutches 114, 116, 118 respectively on the drive transfer plate 36.

The hub 108 of the sun gear 30 also meshes with a clutch 120 that is fixed to the central stationary shaft 14 to prevent rotation of the sun gear 30 when activated.

The arrangement of clutches for transmittal of power from the power input shaft 18 through the transfer plate 26 and the first planetary gearset 28 to the transfer plate 36 is repeated for the second planetary gearset 38 to achieve transmittal of power from the transfer plate 36 through the second planetary gearset 38 and the transfer plate 46 to the power output shaft 48. On the input side of the second planetary gearset 38, there are again clutch cylinders 76', 78' and 80', clutch elements 88', 90' and 92' attached to the torque transmission plate 36, hubs 94', 96', reaction sleeve 98', clutches 100', 102' and 104' and hub 106'. On the output side of the second planetary gearset, there are again hubs 108', 110', 112' extending from the sun gear 40, ring gear 42 and planet carrier 45 respectively. These hubs mesh with clutches 122, 124 and 126 respectively mounted on the output drive plate 46.

Individual reciprocating pumps 128, 130 and 132 of the swash plate type are provided in the plate 26 to serve the respective clutches 76, 78 and 80. Similarly, reciprocating pumps 134 and 136 serve the respective clutches 102 and 104. Pumps 138, 140 and 142 serve the respective clutches 114, 116 and 118. A corresponding arrangement is provided for the second planetary gearset 38. Each of the various reciprocating pumps 128 to 142 is activated by reciprocating against inclinable reaction rings 143 and are inactive if the ring is parallel to the plane of rotation of the drive plates.

Since the individual pumps that activate the respective clutches reciprocate against inclined rings to function, the transfer plates bearing the pumps are required to be in motion. Upon engine startup, only the input plate 26 is turning, with any suitable mechanism being provided to commence movement of the central power transfer plate 36 and the output transfer plate 46 from the stopped condition.

The fixed clutches 100, 100', 120 and 120' are served by hydraulic lines formed in the casing and through the stationary shaft 14 from a single hydraulic pump 144.

In the illustrated embodiment, each of the various clutches is provided with its own individual pump. However, it is also feasible to provide a single pump attached to each of the transfer plate and the reaction sleeves, which then may supply pressure to two-way or three-way valves, as needed. These valves then direct pressure as required to the specific clutches requiring activation.

The two-way and three-way pressure-directing valves may be controlled in a number of ways. For example, valves mounted in the axial plane may be displaced one way or the other by reaction rings set parallel to the plane of rotation.

Where single pumps are employed, as described above, three-way valves are required in each of the input and output plates, two three-way valves in the transfer plate and a two-way valve in each reaction sleeve.

OPERATION

In operation, the individual clutches are activated to achieve clamping of elements together in torque transmitting relationship in the manner described above by operation of the individual pistons. Power input is transmitted by the power input shaft 18 to the power transfer plate 26 through the intermeshing gears 22 and 24. With none of the clutches activated, no power is transmitted by the plate 26.

Activation of clutch 76 clamps the plate 26 to the sun gear 30 to transmit torque thereto. Activation of clutches 100 and 102 locks the ring gear 32 to the reaction sleeve 98, so that torque is transmitted from the sun gear 30 to the planet carrier 35 and, by activation of clutch 118 to the plate 36. The clutch 118 has meshing clutch plates 72 which engage the planet carrier hub 112 and not with ring gear hub 110.

Similarly, activation of clutches 100 and 104 locks the planet carrier 35 to the reaction sleeve 98, so that power is transmitted from the sun gear 30 to the ring gear 32 and, by activation of clutch 116, to the transfer plate 36.

Activation of clutch 78 clamps the plate 26 to the planet carrier 35. Activation of clutch 120 locks the sun gear 30 to the stationary shaft 14, so that power is transmitted to the ring gear 32 and, by activation of clutch 116, to the transfer plate 36.

Similarly, activation of clutches 100 and 102 locks the ring gear 32 to the reaction sleeve 98, causing power to be transmitted from the planet carrier 35 to the sun gear 30 and, through activation of clutch 114 to the transfer plate 36.

Activation of clutches 80 and 102 effects power transmittal to the ring gear 32 through the means of 35 the reaction sleeve 98. Activation of the clutch 120 locks the sun gear 30 to the stationary shaft 14, thereby transmitting power to the planet carrier 35 and, upon activation of clutch 118, to the transfer plate 36.

It will be seen that it is not possible to provide the planet carrier 35 stationary when power is transmitted to the ring gear 32 (to maintain the planet carrier 35 stationary, clutches 100 and 104 need to be activated) and it is for this reason that all six gear ratios are not possible.

From the power transfer plate 36, any of the five power output ratios achieved as just described may be further transferred to the power transfer plate 46 and to the output shaft 48 by suitable clutch activation with respect to the second planetary set 38 in analogous manner as described for the first planetary gearset 28.

Additional planetary gearsets may be included with associated clutches, reaction sleeves and power transfer plates to achieve additional gear ratios, as desired.

The specific activations of various clutches to produce specific output ratios can be seen in FIGS. 4 to 7.

Only the clutches activated during the respective operations are shown. The following Table III correlates the respective Figures with the respective activated clutches to achieve the specific ratios referred to above with respect to Tables I and II:

TABLE III

| FIG. # | Ratio* # | Clutches Activated Gearset 28 | | | | Clutches Activated Gearset 38 | | | Type of Operation |
|---|---|---|---|---|---|---|---|---|---|
| 4 | 1 | 78 | 116 | 120 | | 78' | 120' | 124' | Medium overdrive |
| 5 | 4 | 80 | 102 | 118 | 120 | 80' | 102' | 120' | 126' Medium reduction |
| 6 | 6 | 100 | 104 | 76 | 116 | 100' | 76' | 104' | 124 Reverse |
| 7 | 5 | 100 | 76 | 102 | 118 | 100' | 76' | 102' | 126 Deep Reduction |
| 8 | 2 | 100 | 78 | 102 | 114 | 100' | 78' | 102' | 122 High Overdrive |

*See Table I

Although in this Table III, the same gears are used in the second set as in the first set, different ratios are obtained when different gears are used in the second set.

The total number of possible gear ratios from the two gearsets 28 and 38 is determined from the following considerations. Assuming that each of the two gearsets has a different ratio (i.e. ratio of diameter of ring gear to diameter of sun gear), then twenty-five forward gears result, since the gearset 28 has four forward ratios and the gearset 38 has four forward ratios, each forward ratio in the gearset 28 is matched with each forward ratio in the gearset 38, and reverse ratio in both the gearsets 28 and 38 compound together provide an additional forward ratio, for a total of twenty-five forward ratios (4+4+16+1).

For reverse, each gearset 28 and 38 has a reverse gear ratio, each forward gear ratio in the gearset 28 is matched with the reverse ratio in the gearset 38 and, similarly, each forward gear in the gearset 38 is matched with the reverse ratio in the gearset 28, for a total of ten reverse ratios (2+4+4).

SUMMARY OF DISCLOSURE

In summary of this disclosure, as can be seen from the above description, the present invention employs planetary gearsets, hydraulic clutches, drive plates, individual service of revolving clutches by clutch pistons, reaction sleeves to transmit driving or braking force selectively and a central stationary reaction shaft. This unique combination of elements leads to the provision of a multiple ratio transmission device of simplified structure, which is light in weight, compact, rugged and yet high in mechanical efficiency. Modifications are possible within the scope of this invention.

What I claim is:

1. A power transmission mechanism, comprising:
   a planetary gearset having a sun gear rotatably mounted on a stationary shaft, a ring gear and planet gears mounted in a planet carrier and intermeshing with both said sun gear and said ring gear thereof,
   power input means to said planetary gearset and power output means from said planetary gearset, and
   means for selectively transmitting power from said power input means to said planetary gearset and comprising:
      power transfer plate means rotatably mounted on said stationary shaft adjacent to and operatively connected to said power input means, selectively operable hydraulic clutch means connecting said power transfer plate and thereby transmitting power from said power input means to a selected one of said sun gear, ring gear and planet carrier of said planetary gearset, and selectively operable hydraulic clutch means for selectively connecting said sun gear to said stationary shaft and said ring gear and planet carrier to a reaction sleeve to maintain another selected one of said sun gear, ring gear and planet carrier of said planetary gear set stationary, other than to maintain said planet carrier stationary when power is transmitted to said ring gear,
   whereby the one of the sun gear, ring gear and planet carrier to which power is not transmitted and is not maintained stationary produces a power output to said power output means having one of four forward and one reverse speeds with respect to said power input means.

2. A power transmission mechanism, comprising:
   a stationary shaft,
   a first planetary gearset having a sun gear, a ring gear and planet gears mounted in a planet carrier and intermeshing with both said sun gear and said ring gear thereof, said sun gear thereof being rotatably mounted on said stationary shaft,
   a second planetary gearset having a sun gear, a ring gear and planet gears mounted in a planet carrier and intermeshing with both said sun gear and said ring gear thereof, said sun gear thereof being rotatably mounted on said stationary shaft longitudinally-spaced from said first planetary gearset,
   power input means and power output means,
   means for selectively transmitting power from said power input means to one of said sun gear, ring gear and planet carrier of said first planetary gearset while another of said sun gear, ring gear and planet carrier of said first planetary gearset is maintained stationary, except that, when power is transmitted to said ring gear, said planet carrier is incapable of being maintained stationary, whereby the remainder of said sun gear, ring gear and planet carrier of said first planetary gearset produce a first planetary gearset power output having one of four forward and one reverse speeds with respect to said power input,
   means for selectively transmitting power from said first planetary gearset power output to one of said sun gear, ring gear and planet carrier of said second planetary gearset while another of said sun gear, ring gear and planet carrier of said second planetary gearset, except that, when power is transmitted to said ring gear, said planet carrier is incapable of being maintained stationary whereby the remainder of said sun gear, ring gear and planet carrier of said second planetary gearset produce a second planetary gearset power output having one of four forward and one reverse speeds with respect to said first planetary gearset power output, and means operatively connecting said second planetary gearset power output to said power output means.

3. The transmission of claim 1, wherein means for selectively transmitting power from said power input means comprises:
first power transfer plate means rotatably mounted on said stationary shaft adjacent to and operatively connected to said power input means, selectively-operable hydraulic clutch means connecting said first power transfer plate means and said sun gear, ring gear and planet carrier of said first planetary gearset, and selectively-operable hydraulic clutch means for connecting said sun gear to said stationary shaft and said ring gear and said planet carrier to a reaction sleeve.

4. The transmission of claim 2, wherein said means for selectively transmitting power from said first planetary gearset power output comprises:
second power transfer plate means rotatably mounted on said stationary shaft between said planetary gearsets and selectively-operable clutch means connecting said second transfer plate means and said sun gear, ring gear and planet carrier of said first planetary gearset, selectively-operable hydraulic clutch means connecting said second transfer plate means and said sun gear, ring gear and planet carrier of said second planetary gearset, and selectively-operable hydraulic clutch means for connecting said sun gear to said stationary shaft and said ring gear and planet carrier to a reaction sleeve.

5. The transmission of claim 2 wherein said means operatively connecting said second planetary gearset to said power output means comprises:
third power transfer plate means rotatably mounted on said stationary shaft adjacent to and operatively connected to said power output means and selectively-operable hydraulic clutch means connecting said third transfer plate means and said sun gear, ring gear and planet carrier of said second planetary gearset.

6. The transmission of claim 2 wherein the ratio of the diameter of the ring gear that of the sun gear of said first planetary gearset is different from the ratio of the diameter of the ring gear to that of the sun gear of said second planetary gearset.

* * * * *